Figure 1:
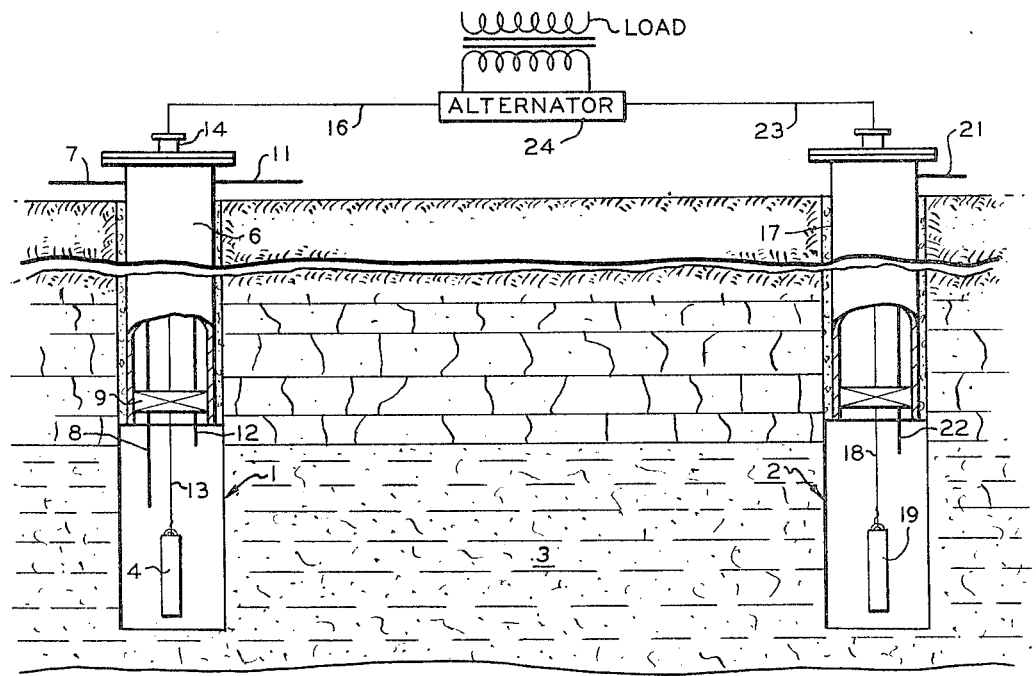

Oct. 11, 1966     D. O. HITZMAN     3,278,335

PROCESS FOR PRODUCING ELECTRICITY FROM UNDERGROUND FUEL CELL

Filed June 20, 1962

INVENTOR.
D. O. HITZMAN
BY *Young & Quigg*
ATTORNEYS

United States Patent Office 3,278,335
Patented Oct. 11, 1966

3,278,335
PROCESS FOR PRODUCING ELECTRICITY FROM UNDERGROUND FUEL CELL
Donald O. Hitzman, Bartlesville, Okla., assignor to Phillips Petroleum Company, a corporation of Delaware
Filed June 20, 1962, Ser. No. 203,758
7 Claims. (Cl. 136—85)

This invention relates to an underground biochemical fuel cell. In another aspect, it relates to a method and apparatus for producing electrical energy from a biochemical fuel cell located underground in an oil-bearing formation, particularly in connection with the recovery of oil.

Many investigations are underway in developing fuel cells for the conversion of chemical energy directly into electrical energy. I have discovered that a fuel cell of novel features can be constructed and operated by employing certain bacteria and relying on their metabolic action in underground oil-bearing formations. Such a fuel cell can be termed an underground biochemical fuel cell, the locus of the bacteria and the oil being underground in oil-bearing formations, particularly those formations which have been partially depleted by primary recovery methods or those formations where the oil is held in formations of low permeability, such as oil sands and tar sand.

According to my invention, the oil-bearing formation, such as a tar sand, is innoculated with active cultures of certain bacteria and an electrode (anode) is placed in communication witth the resulting products of metabolism. Another electrode (cathode) is disposed at another location in the oil-bearing formation and it is in contact with an electrolyte containing an oxidant, such as aerated salt water. The electrodes are in contact with and communicate with each other through an underground salt bridge, for example the saline connate water present in the formation, this salt bridge serving as an invariant porous electrolyte. An external circuit (above ground) is completed by connecting the two electrodes to an external load, which utilizes the electrical energy produced by the biochemical fuel cell.

The biochemical fuel cell of this invention can be operated in conjunction with the secondary oil recovery technique of water flooding or gas drives, so that the more mobile oil released and/or formed by the action of the bacteria in the underground deposits of oil can be produced together with the electrical energy of the biochemical fuel cell.

The bacteria I can employ in the biochemical fuel cell of this invention (as a "catalyst") can broadly include any of the anaerobic and facultative types, particularly the anaerobic sulfate-reducing bacteria of the genus Desulfovibrio, including the species *desulfuricans,* and *aestuarii.* Facultative organisms which can be used include Pseudomonas, species *aeruginosa, desmolyticum, rathonas, arvilla;* Serratia *marcescens;* Achromobacter, species *liquefaciens;* Flavobacterium, species *diffusum;* Escherichia, species *coli, freundii;* Aerobacter, species *aerogenes;* Corynebacterium, species *heldvolum;* Methanomonas, species *methanica;* Vibrio, species *clyclosites;* Micrococcus, species *agilis;* Sarcina, species *lutea, littoralis;* and Acetobacter, species, *aceti.*

These bacteria can be grown in a suitable nutrient and a nutrient solution of the active cultures can be used to innoculate the oil-bearing formation by any suitable procedure, for example by introducing the inoculating medium into the formation through a well by means of a dump bailer or the medium can be pumped into the well and injected into the formation. Nutrients which can be used will be dependent upon the particular species of bacterial used. In the case of *Desulfovibrio desulfuricans,* a suitable inoculating medium can be prepared by dissolving in each 1000 ml. of sea water about 0.2 gm. of potassium phosphate, 0.2 gm. of magnesium sulfate, 1 gm. of sodium sulfate, 0.2 gm. of sodium sulfite, 0.1 gm. of ammonium chloride, 0.1 gm. of ascorbic acid, and 3gm. of sodium lactate. After inoculation of the oil-bearing formation, there will generally be an induction period where the bacteria are allowed to grow and multiply. During this time, and throughout the life of the fuel cell, supplementary nutrients for increased stimulation can be injected into the well, including carbonaceous fuels such as molasses; new cultures can also be injected periodically into the well.

Where the invention is carried out in conjunction with the secondary recovery of oil, the nutrient medium can be pumped into the well under sufficient pressure to insure extensive inoculation of the oil-bearing formation surrounding the well. A continuous supply of the oil necessary for the metabolic action can be insured by injecting an oxygen-containing fluid, such as air or aerated salt water, into one or more other adjacent wells in a secondary recovery well pattern to move the oil toward the inoculating or producing well in the locus of the cultures of bacteria. Any oil or gas liberated by the metabolic action of the bacteria can be produced from a producing well.

This fuel cell provides a convenient and low-cost source of low-voltage direct current, generally on the order of 0.5 to 1.5 volts, due to the potential difference between the electrodes. Regulation of this potential can control the migration of the bacteria in the oil-bearing formation and maintain their locus in the formation. The current produced by the biochemical fuel cell will be dependent upon the rate of metabolism, the number of bacteria, and the number of electrons released at the anode. Efficiencies on the order of 40 percent and greater can be expected. A more useable direct current can be produced by connecting a plurality of such biochemical fuel cells in series or in parallel. The fuel used in this fuel cell is of low cost, and in many instances will have no other economic value.

Further understanding of this invention can be gained from the following description of the accompanying drawing.

In FIGURE 1, there is illustrated a biochemical fuel cell of this invention. The fuel cell of FIGURE 1 is composed in general of two sections, an anode section generally designated 1 formed by a first well and a cathode section generally designated 2 formed by another well, separated by an ion-diffusion salt bridge generally designated 3 which can comprise an underground oil-bearing formation containing salt water as an electrolyte (e.g., connate water) or the oil-bearing formation can have an overlying or underlying salt bridge of this nature. The anode well 1 is provided with a porous, inert electrode (anode) 4, made of carbon, metal oxide, or metal such as platinum, disposed adjacent formation 3 and immersed in a nutrient solution containing active cultures of bacteria, these bacteria propagating in the surrounding formation. The nutrient solution will usually have a pH in the neutral range and a redox potential suitable for the growth of the bacteria, e.g., $E_h$—0.05 to —0.35 volt. The temperature of the nutrient will be that of the well and can be up to about 175° F. to 200° F. Salinity of the nutrient can be as high as 300,000 p.p.m. and it can have a density of about 1.05 to 1.3. Carbonaceous or petroliferous fuel necessary for the metabolic processes of the bacteria is disposed in formation 3 at the locus of said bacteria. Well 1 is provided with a conventional casing 6 with the usual well head equipment for the introduction and withdrawal of fluids. For example, a surface conduit 7 can be connected to the wellhead of casing 6 and it can communicate by means of depending pipe 8, which passes through a packer 9, with oil released by the bacteria from the formation and disposed (because of its lower density) above the nutrient solution in the well. This released oil can be withdrawn by means of conduits 7, 8 and produced in a conventional manner by the usual production techniques, such as by a submergable pump. Well 1 can also be provided with a surface conduit 11, which communicates with another pipe 12 depending in the well, the latter also passing through packer 9, to remove any gas, such as carbon dioxide, methane, hydrogen sulfide, or hydrogen, also released by the metabolic processes of the bacteria. Electrode 4 can be electrically connected to and suspended in well 1 by a suitable armored cable 13, which passes through an insulated stuffing box 14 at the wellhead of the well and is connected to surface cable 16.

The cathode well 2 is located at a point remote from anode well 1, for example 500 feet, and it too is provided with the usual casing 17. An electrode (cathode) 19 is also suspended by means of an armored cable 18 in well 2 at a point adjacent formation 3. Electrode 19 is submerged in an oxidant fluid, such as oxygen-containing liquid or gas, for example aerated water or air, which can be pumped into well 2 by means of surface conduit 21 and pipe 22.

Electrode cables 13 and 18 are connected at the surface of the ground by surface cables 16 and 23 to a suitable load so as to complete an external circuit. For example, electrode cables 16 and 23 can be connected to an alternator 24 or the like for the conversion of the low voltage direct current to alternating current, which can have its voltage stepped-up by a transformer.

As mentioned above, the subject biochemical fuel cell can be operated in conjunction with the secondary recovery technique such as water flooding or gas drive. For example, aerated salt water can be pumped into the cathode well 2 under pressure to move the bank of oil present in the oil-bearing formation 3 toward the anode well 1, in which case the cathode well 2 serves as an injection well and the anode well 1 serves as a producing well. The arrangement of such injection wells and producing wells can vary widely in accordance with the formations being produced. A typical arrangement is the so-called five-spot arrangement in which producing well is located at the center of a square and is surrounded by four injection wells at the corners of the square. An alternate arrangement is the so-called seven-spot arrangement in which each producing well is located at the center of a hexagon and is surrounded by six injection wells at the corners.

Figure 2:
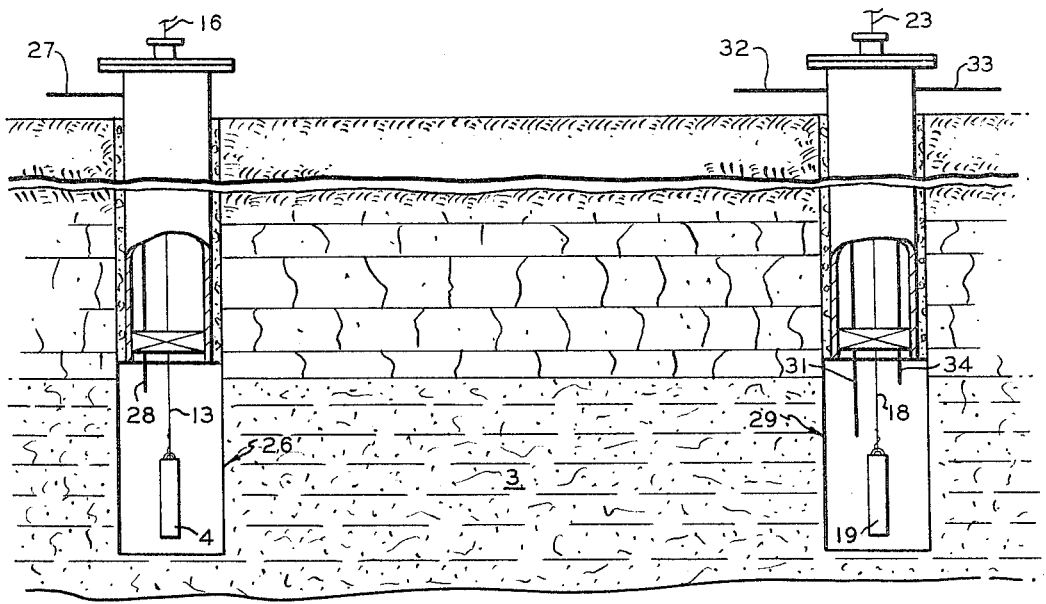

FIGURE 2 illustrates another embodiment of the underground biochemical fuel cell of this invention. In this embodiment, drive fluid, such as brine, containing bacterial cultures, is pumped into well 26 via lines 27, 28 and into the formation 3. Oil released or formed is produced from well 29 via lines 31, 32 and electrode 19 is maintained in contact with a fluid oxidant, such as air, bubbled into well 29 via lines 33, 34.

By operating the biochemical fuel cell of this invention in conjunction with secondary recovery techniques, not only are the bacteria assured of a continuing supply of oil necessary for their growth and multiplication (and release of electrons), but oil can be produced and contribute to the attractive economics of the operation.

It is also within the scope of this invention to employ a single well to contain the elements of the biochemical fuel cell. For example, the two electrodes can be suspended within a single well, each electrode at a different elevation, one electrode immersed in the nutrient solution containing the active bacteria cultures and adjacent an oil bearing formation and the other electrode in contact with a fluid oxidant and in communication with the other electrode through a salt bridge, e.g., connate water containing salt or a slug of salt water in the well between the two electrodes. Such a well can be provided with tubing to supply the requisite cultures, nutrient, and fluid oxidant, etc., and tubing for withdrawal of any oil released or produced.

Various modifications and alterations of this invention will become apparent to those skilled in the art from the foregoing discussion and accompanying drawing, and it should be understood that this invention is not to be limited unduly to that set forth herein for illustrative purposes.

I claim:

1. A method for producing electrical energy, which comprises inoculating an underground oil-bearing formation with bacteria which will grow and multiply therein, growing and multiplying said bacteria in said formation, disposing a first electrode in a first well penetrating said formation and in communication with the products of metabolism of said bacteria, disposing a second electrode in a second adjacent well penetrating said formation, and communicating with said bacterial through an underground salt bridge, contacting said second electrode with an oxidant selected from the group consisting of oxygen, air, and aerated water; connecting said electrodes to an external load and producing electrical energy.

2. The method according to claim 1, wherein aerated water is pumped into said second well as said fluid oxidant medium, and oil is produced from said first well.

3. The method according to claim 1, wherein brine is pumped into said first well, oil is produced from said second well, and air is bubbled into said second well to serve as said fluid oxidant medium.

4. The method according to claim 1, wherein said bacteria are *Desulfovibrio desulfuricans*.

5. A method of producing electrical energy, which comprises inoculating an underground oil-bearing formation with bacteria which will grow and multiply therein, growing and multiplying said bacteria in said formation, disposing a first electrode in a well penetrating said formation and in communication with the products of metabolism of said bacteria, disposing a second electrode in said well and in communication with said bacteria through a salt bridge and with an oxidant selected from the group consisting of oxygen, air and aerated water; connecting said electrodes to an external load and producing electrical energy.

6. A method of producing electrical energy, which comprises inoculating an underground oil-bearing formation with bacteria which will grow and multiply therein, growing and multiplying said bacteria in said formation, disposing a first electrode in communication with the products of metabolism of said bacteria, disposing a second electrode in communication with said bacteria through a salt bridge and with an oxidant selected from the group consisting of oxygen, air and aerated water; connecting said electrodes to an external load and producing electrical energy.

7. A method for producing electrical energy and oil which comprises:

inoculating an underground tar sand oil-bearing formation with *Desulfovibrio desulfuricans* bacteria in a nutrient having a density of 1.05 to 1.3 grams per cc., growing and multiplying said bacteria in said formation, disposing a carbon electrode in a first well penetrating said formation and in communication with the products of metabolism of said bacteria, disposing a second carbon electrode in a second adjacent well penetrating said formation, and communicating with said bacteria through saline connate water in said formation, contacting said second electrode with aerated water, connecting said electrodes to an external load and producing said electrical energy, and recovering oil from said first well released by said bacteria from said formation.

(References on following page)

References Cited by the Examiner

UNITED STATES PATENTS

| | | | |
|---|---|---|---|
| 155,209 | 9/1874 | Snow | 136—85 |
| 2,413,278 | 12/1946 | Zozell. | |
| 2,818,118 | 12/1957 | Dixon | 166—65 X |
| 2,907,389 | 10/1959 | Hitzman | 166—1 X |
| 3,103,975 | 9/1963 | Hanson | 166—42.1 |

OTHER REFERENCES

Bergeys' Manual of Determinative Bacteriology, pp. 248–249, Seventh ed., 1957.

Journal of Bacteriology, vol. 21, January–June 1931, pp. 18 and 19.

Popular Science, January 1962, pp. 29 and 68.

Power Plant Eng., June 1946, p. 84.

Proc. Royal Soc., London (Series B), Biological Papers, vol. 84, March 1912, pp. 260–276.

Science and Mechanics, August 1961, pp. 116–117.

WINSTON A. DOUGLAS, *Primary Examiner.*

H. FEELEY, A. B. CURTIS, *Assistant Examiners.*
JOSEPH REBOLD, JOHN R. SPECK, *Examiners.*